Sept. 8, 1931.  J. A. WEIGER  1,822,682

VALVE SEAT

Filed June 12, 1928

W − Ag

INVENTOR.
Joseph A. Weiger
BY Mayer Warfield & Watson
ATTORNEYS.

Patented Sept. 8, 1931

1,822,682

UNITED STATES PATENT OFFICE

JOSEPH A. WEIGER, OF UNION CITY, NEW JERSEY, ASSIGNOR, BY MESNE ASSIGNMENTS, TO P. R. MALLORY & CO., INCORPORATED, OF INDIANAPOLIS, INDIANA, A CORPORATION OF INDIANA

VALVE SEAT

Application filed June 12, 1928. Serial No. 284,843.

This invention relates to valve seats and the like, and more particularly to valve seats which are subjected to the action of highly erosive fluids at relatively high pressures.

The invention has for its object generally to provide a device of the character described which is durable and economical and has highly efficient operating characteristics.

More specifically, an object is to provide a valve seat formed of a composition which renders it admirably suited for use in pipelines through which pass erosive fluids at relatively high pressure, which is sufficiently yieldable to form a good seal with a hard valve member and which at the same time has sufficient wear resisting properties not to become unduly eroded in the class of service for which it is designed.

Other objects of the invention will in part be obvious and will in part appear hereinafter.

The invention accordingly comprises the features of construction, combinations of elements, and arrangement of parts, which will be exemplified in the constructions hereinafter set forth and the scope of the application of which will be indicated in the claims.

Figure 1:
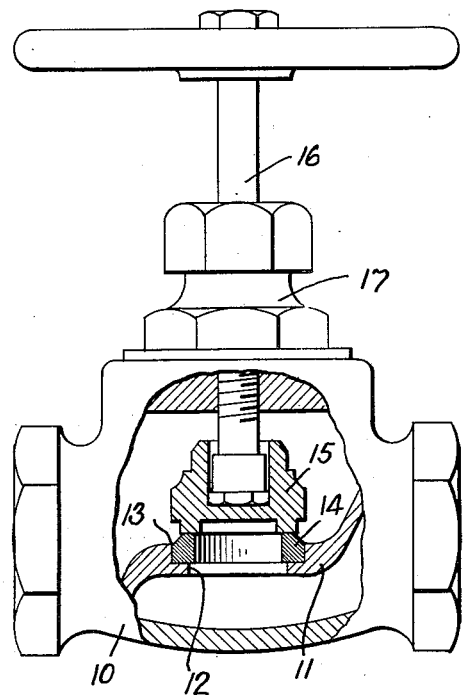
Figure 2:
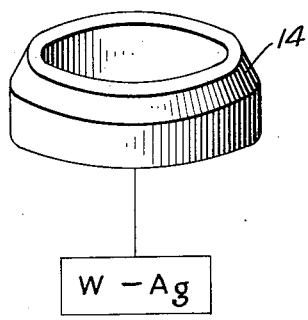

For a fuller understanding of the nature and objects of the invention reference should be had to the following detailed description taken in connection with the accompanying drawings, in which:

Figure 1 shows, partly in elevation and partly in section, a valve construction embodying the invention; and Fig. 2 shows in perspective a valve seat member of the present invention, removed from a valve.

Referring now to the drawings, 10 denotes the casing of a valve which has a bridge wall 11 formed with a horizontal valve opening 12. This opening has a concentric countersunk channel 13 formed around its edge in which the valve seat member 14 is set. This valve seat member is shown in enlarged form in Fig. 2 and comprises an annular body having a chambered or inwardly tapered upper edge on which a valve member 15 seats. The valve seat member 14 has its lower portion of a diameter such as to fit snugly in the opening at 13. The valve member 15 is connected to be manipulated by the valve stem 16 passing through the wall of the casing 10 in any convenient manner, for example through a packing gland as shown at 17.

In the practice of the invention, the valve seat herein employed is constructed to be sufficiently yieldable that a hard valve member 15 may seat thereon and form a gas-tight or liquid-tight seal therewith. It is also desired that this valve seat shall be durable in connection with the control of erosive fluids when pressures of 500 pounds per square inch and upwards are employed.

It has been ascertained that a body of tungsten which has inherently wear-resisting and erosion-resisting properties may be impregnated with a softer metal so as to give it sufficient elasticity and yieldability to enable it to serve as the material from which to construct a valve seat having the desired characteristics. A body of porous tungsten such as is produced by pressing together, in slug form, fine particles of tungsten powder in a press under a pressure approximating 50 tons per square inch or greater, is found to yield a body having sufficient porosity to take up a relatively large amount of low melting point metal when given a heat treatment sufficient to melt the low melting point metal in a reducing atmosphere into a freely flowing liquid.

The low melting point metal of the present invention, however, is a metal which does not detract substantially from the erosion-resisting properties of tungsten but is taken to enhance the same. That class of metals known as the so-called "noble metals" include those best adapted for this purpose, for example, silver, gold, and platinum. Of these, silver is preferred because of its lighter weight and because it is also highly resistant to the action of liquids and gases commercially employed and passed through piping systems at relatively high pressures. The impregnating metal may be taken in varying amount, it being understood that the porous tungsten body, to absorb a small quantity of impregnating metal, is more highly compressed than when it is desired to absorb a relatively large body of impregnating metal. It is, however, not desired to take the impregnating metal in an amount so great as to detract materially from the characteristics conferred upon the valve seat member by the employment of tungsten. An upper limit to the amount of impregnating metal is substantially 40% by weight for silver. A lesser amount of gold or platinum would be employed which would be substantially inversely proportional as the atomic weights involved increase, since the yieldability, rigidity and wear-resisting properties appear to be functions of the relative bulks of the impregnating metal and of the porous body employed.

The following is given as an example of a composition of a valve seat member constructed in accordance with the present invention, which is particularly adapted for use in valves designed to control the flow of anhydrous ammonia at pressures upwards of 500 pounds per square inch:

Tungsten _____ 70% by weight
Silver _____ 30% by weight

While this invention has been shown specifically as used in connection with valves, it is obvious by reason of the characteristics possessed by the composition of the present invention, that it may be used wherever highly erosive fluids under pressure are to be controlled or conveyed, for example in pressure fittings.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:

1. A valve seat for use in conduits adapted to convey highly erosive fluids comprising a body of porous tungsten and an impregnating body of noncorrosive, relatively low melting point metal.

2. A valve seat for use in conduits adapted to convey highly erosive fluids comprising a body of porous tungsten and an impregnating body of a noble metal.

3. A valve seat for use in conduits adapted to convey highly erosive fluids comprising a body of porous tungsten and an impregnating body of a metal from the group including silver, gold and platinum.

4. A valve seat for use in conduits adapted to convey highly erosive fluids comprising a body of porous tungsten and an impregnating body of silver.

5. A valve seat for use in conduits adapted to convey highly erosive fluids comprising a body of porous tungsten and an impregnating body of silver taken in an amount not greater than 40% by weight of the whole.

In testimony whereof I affix my signature.

JOSEPH A. WEIGER.